United States Patent
Kurihara

(10) Patent No.: US 8,363,272 B2
(45) Date of Patent: Jan. 29, 2013

(54) IMAGE FORMING SYSTEM AND METHOD FOR RE-RASTERIZING AND RE-GENERATING IMAGE DATA

(75) Inventor: Susumu Kurihara, Hino (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 573 days.

(21) Appl. No.: 12/483,396

(22) Filed: Jun. 12, 2009

(65) Prior Publication Data

US 2009/0316171 A1 Dec. 24, 2009

(30) Foreign Application Priority Data

Jun. 24, 2008 (JP) ................................. 2008-164060

(51) Int. Cl.
*G06K 15/00* (2006.01)
*G06F 3/12* (2006.01)
(52) U.S. Cl. ......... 358/1.9; 358/2.1; 358/1.13; 358/1.14
(58) Field of Classification Search .................. None
See application file for complete search history.

(56) References Cited

U.S. PATENT DOCUMENTS

| | | | | |
|---|---|---|---|---|
| 2004/0042035 A1* | 3/2004 | Uejo | ........................... | 358/1.15 |
| 2004/0090644 A1* | 5/2004 | Nishikawa | .................... | 358/1.13 |
| 2006/0039012 A1* | 2/2006 | Ferlitsch | ......................... | 358/1.1 |
| 2007/0121144 A1* | 5/2007 | Kato | ............................ | 358/1.14 |

FOREIGN PATENT DOCUMENTS

| | | |
|---|---|---|
| JP | 2004-086809 A | 3/2004 |
| JP | 2004-086810 A | 3/2004 |
| JP | 2004-086811 A | 3/2004 |

\* cited by examiner

*Primary Examiner* — Benny Q Tieu
*Assistant Examiner* — Haris Sabah
(74) *Attorney, Agent, or Firm* — Buchanan Ingersoll & Rooney PC

(57) ABSTRACT

Disclosed is an image forming system, in which the printer controller is capable of performing the re-RIP (Regeneration Raster Image Processing) in conformity with the revised page order accepted from the image forming apparatus. When determining that the re-RIP is necessary, the image forming apparatus transmits a regeneration request including revised page order information, changed from the original page order, to the printer controller. Receiving the regeneration request, the printer controller reapplies the rasterization processing to the print data while using the data stored in advance in the storage section, to regenerate the revised image data corresponding to the page information, and then, transmits the revised image data to the image forming apparatus. Receiving the revised image data regenerated in response to the regeneration request, from the printer controller, the image forming apparatus employs the revised image data for performing the image forming operation in regard to the print job.

15 Claims, 10 Drawing Sheets

FIG. 5

SETTING CONFIRMATION / TICKET EDITING

PREVIEW

FUNDAMENTAL SETTING ITEMS

| TRAY | TRY 1 |
| --- | --- |
| DESIGNATED PRINT PAPER SHEET | KONUMA PRINTING DESIGNATED NO. 006-A |
| NUMBER OF COPIES | 100 COPIES |
| PRINTING MODE | DUPLEX PRINTING |
| MAGNIFICATION FACTOR | 100.00% |
| COLOR MODE | FULL COLOR |

IMAGE QUALITY SETTING ITEMS

| COPY DENSITY | +4 |
| --- | --- |
| BACKGROUND ADJUSTMENT | 0 |
| PRINT-THROUGH PREVENTION | +2 |
| RED COLOR | +9 |
| GREEN COLOR | +9 |
| BLUE COLOR | +4 |
| HUE | 0 |
| SATURATION | -2 |
| BRIGHTNESS | -5 |
| SHARPNESS | +4 |
| CONTRAST | 0 |
| CHARACTER PHOTOGRAPHIC DISCRIMINATION | +3 |
| COLOR CHARACTER DISCRIMINATION | -3 |
| SCREEN SELECTION | NORMAL SCREEN |
| COLOR BALANCE: FULL DENSITY | C-00 M-05 Y-03 K-0 |
| : HIGH DENSITY | C-00 M-05 Y-03 K-0 |
| : MIDIUM DENSITY | C-00 M-05 Y-03 K-0 |
| : LOW DENSITY | C-00 M-05 Y-03 K-0 |
| GLOSS | ON |

OUTPUT SETTING ITEMS

| EJECTING TRAY | TRAY NO. 3 |
| --- | --- |
| BOTH SIDE STAPLING DIRECTION | LEFT-LIGHT |
| PAPER SHEET EJECTION FACE/ORDER | UP |
| SORT / GROUP | ASSORTMENT SORTING |
| STAPLING | LEFT CORNER |
| SADDLE STITCHING | ACTIVATED WITH CUTTING ON |
| OVERLAPPED MIDDLE FOLDING | DEACTIVATED |
| OVERLAPPED THREE FOLDING | OUTER PRINTING |
| PUNCHING HOLE | DEACTIVATED |
| FOLDING | INSIDE 3 |
| CASING-IN BOOKBINDING | ACTIVATED |

APPLICATION SETTING ITEMS

| INTER-SHEET: COVER SHEET | TOP COVER SHEET |
| --- | --- |
| | PRINTING PAPER SHEET |
| : INSERTION SHEET | :PI TOP COVER SHEET |
| CHAPTER DISCRIMINATION: PRINTING SHEET INSERTION | TRAY 1 |
| | :PAGE 3,9,100,120 |
| INTEGRATION | 2 IN 1 |
| BOOKLET | WITHOUT COVER SHEET |
| INSERTION | |
| BOOK CONTINUOUS COPYING | |
| PROGRAMMED JOB | |
| ENLARGEMENT CONTINUOUS COPYING | |
| DOCUMENT OUTER DELETION | |
| NEGATIVE/POSITIVE INVERSION | |
| REPEAT | |
| FRAME/FOLD-LINE ERASING: | |
| LUMP ERASE | |
| : INDIVIDUAL ERASE | |
| : FRAME ERASE | |
| CENTERING | |
| BINDING MARGIN: SHIFT | |
| : REDUCED SHIFT | |
| STAMPING: OVERLAY | |
| : FIXED STAMPING | |
| : NUMBERING | |
| PAGE | |
| DATE/TIME | |
| WATERMARK | |
| NUMBERING | |
| OVERLAY REGISTERING | |

1/3

CLOSE  SETTLEMENT  PAGE EDITING  SAMPLE OUTPUT

IMAGE FORMING SYSTEM AND METHOD FOR RE-RASTERIZING AND RE-GENERATING IMAGE DATA

This application is based on Japanese Patent Application NO. 2008-164060 filed on Jun. 24, 2008, with Japan Patent Office, the entire content of which is hereby incorporated by reference.

BACKGROUND OF THE INVENTION

The present invention relates to an image forming system, which is provided with a printer controller that performs a rasterization processing to create image data and an image forming apparatus that performs an image forming operation based on the image data created by the printer controller.

The print processing based on print data, which represents characters and drawings by employing code data and vector data (for instance, Page Description Language) is performed according to such a processing flow that includes: creating image data in the format of bitmap by applying the rasterization processing (hereinafter, also referred to as RIP (Raster Image Processing)) to print data in the printer controller; transmitting a set of data for a specific print job, including the image data concerned, from the printer controller to the image forming apparatus; and forming an image onto a paper sheet in the image forming apparatus, based on the set of data received.

Further, in some cases, the system is so constituted that the image forming apparatus is provided with a mass storage section, such as a HDD (Hard Disc Drive), etc., to temporally store the set of data for the print job received from the printer controller, therein, so as to make it possible to perform various kinds of editing operations to be applied to the concerned print job from an operating display section provided in the image forming apparatus (refer to Tokkai 2004-86809, Tokkai 2004-86810 and Tokkai 2004-86811, Japanese Non-Examined Patent Publications). For instance, the various kinds of editing operations abovementioned may include operations for changing setting items in regard to the one-side/duplex printing mode and the output tray, setting items in regard to the punching, folding and binding post processing, setting items in regard to the color tone and the kind of paper sheet, etc.

The above-cited editing operations can be categorized into a group of setting items, with which can be coped only by the processing to be conducted by the image forming apparatus side, and another group of setting items, with which cannot be coped only by the processing to be conducted by the image forming apparatus side, but, which require the regeneration processing for regenerating the image data by performing the rasterization processing in the printer controller (hereinafter, referred to as a re-RIP (Regeneration Raster Image Processing)).

Other than the abovementioned, the various kinds of editing operations also includes those in regard to the changes of the page structure of the concerned print job, such as a change of page order, a deletion of page, an insertion of white paper sheet, etc. Conventionally, since it has been impossible for the printer controller side to cope with such the editing operations in regard to the changes of the page structure, the image forming apparatus side has performed the editing operations thereof. Concretely speaking, even when the editing operations, in regard to the changes of both the page structure and the setting item that requires the re-RIP, have been instructed, the printer controller has performed the re-RIP while leaving the page structure as it is before applying its changing operation, and then, the image forming apparatus has applied the operation for changing the page order, etc. to the image data regenerated by the re-RIP.

SUMMARY OF THE INVENTION

To overcome the abovementioned drawbacks in conventional image forming system, it is one of objects of the present invention to provide an image forming system, in which the printer controller is capable of performing the re-RIP (Regeneration Raster Image Processing) in conformity with the revised page order accepted from the image forming apparatus.

Accordingly, at least one of the objects of the present invention can be attained by any one of the image forming systems, the image forming apparatuses, the image forming methods and the computer readable storage mediums, described as follows.

(1) According to an image forming system reflecting an aspect of the present invention, the image forming system, comprises: a printer controller that applies a rasterization processing to print data in regard to a print job so as to generate image data in regard to the print job, and that is provided with a first storage section to store data being necessary for reapplying the rasterization processing to the print data in regard to the print job, therein; and an image forming apparatus that receives job data in regard to the print job, which includes the image data and which is sent from the printer controller, so as to perform an image forming operation based on the image data in regard to the print job, and that is provided with a second storage section, a display operating section and a control section; wherein the control section makes the second storage section store the job data in regard to the print job received from the printer controller, therein, and accepts editing operations including an operation for changing a page order of pages included in the print job, inputted through the display operating section, so as to determine whether or not it is necessary to regenerate revised image data by reapplying the rasterization processing to the print data, based on contents of the editing operations inputted through the display operating section; wherein, when determining that it is necessary to regenerate the revised image data, the control section transmits a predetermined regeneration request including page information for indicating a revised page order, changed from the page order of the pages included in the print job, to the printer controller; wherein, receiving the predetermined regeneration request, the printer controller reapplies the rasterization processing to the print data while using the data stored in advance in the first storage section, so as to regenerate the revised image data corresponding to the page information, and then, transmits the revised image data to the image forming apparatus; and wherein, receiving the revised image data regenerated in response to the predetermined regeneration request, from the printer controller, the image forming apparatus employs the revised image data for performing the image forming operation in regard to the print job.

(2) According to another aspect of the present invention, in the image forming system recited in item 1, the control section further accepts editing operations in regard to a deletion of a specific page and an insertion of a white paper sheet, and makes the page information include information in regard to abovementioned change items.

(3) According to still another aspect of the present invention, in the image forming system recited in item 1 or item 2, based on the page information, the printer controller sequentially regenerates image data sets, respectively corresponding to the pages included in the print job, and sequentially transmits the image data sets to the image forming apparatus one by one in an order, a top page first; and the image forming apparatus commences the image forming operation in regard to the print job, even in mid-course of receiving the image data sets, serving as the revised image data regenerated in response to the predetermined regeneration request.

(4) According to an image forming apparatus reflecting still another aspect of the present invention, the image forming apparatus that performs an image forming operation based on image data in regard to a print job, comprises: a print data processing section to apply a rasterization processing to print data, included in the print job, so as to generate the image data; a first storage section to store data, being necessary for reapplying the rasterization processing to the print data, in advance therein; a second storage section to store job data in regard to the print job, including the image data generated by the print data processing section, therein; a display operating section to accepts editing operations, including an operation for changing a page order of pages included in the print job, inputted by a user; and a control section to determine whether or not it is necessary to make the print data processing section reapply the rasterization processing to the print data so as to regenerate revised image data, based on contents of the editing operations inputted by the user through the display operating section; wherein, when determining that it is necessary to regenerate the revised image data, the control section makes the print data processing section reapply the rasterization processing to the print data while using the data stored in advance in the first storage section, so as to regenerate the revised image data corresponding to page information that indicates a revised page order, changed from the page order of the pages included in the print job.

(5) According to still another aspect of the present invention, in the image forming apparatus recited in item 4, when the revised image data is regenerated, the image forming operation is conducted by employing the revised image data, instead of the image data originally stored in the second storage section.

(6) According to still another aspect of the present invention, in the image forming apparatus recited in item 4 or item 5, the display operating section further accepts editing operations in regard to a deletion of a specific page and an insertion of a white paper sheet, and the control section makes the page information includes information in regard to abovementioned change items.

(7) According to still another aspect of the present invention, in the image forming apparatus recited in any one of items 4-6, based on the page information, the print data processing section sequentially regenerates image data sets, respectively corresponding to the pages included in the print job, one by one in an order, a top page first; and the image forming operation in regard to the print job is commenced, even in mid-course of regenerating the image data sets, serving as the revised image data.

(8) According to a method reflecting still another aspect of the present invention, the method for performing an image forming operation based on image data in regard to a print job, comprises: applying a rasterization processing to print data, included in a print job, so as to generate image data; storing data, being necessary for reapplying the rasterization processing to the print data, in advance into a first storage section; storing job data in regard to the print job, including the image data generated by the print data processing section, into a second storage section; accepting editing operations, including an operation for changing a page order of pages included in the print job, inputted by a user; and determining whether or not it is necessary to regenerate revised image data, based on contents of the editing operations inputted by the user; wherein, when determining that it is necessary to regenerate the revised image data, the rasterization processing is reapplied to the print data by using the data stored in advance in the first storage section, so as to regenerate the revised image data corresponding to page information that indicates a revised page order, changed from the page order of the pages included in the print job.

(9) According to still another aspect of the present invention, in the method recited in item 8, when the revised image data is regenerated, the image forming operation is conducted by employing the revised image data, instead of the image data originally stored in the second storage section.

(10) According to still another aspect of the present invention, the method recited in item 8 or item 9, further comprises: accepting editing operations in regard to a deletion of a specific page and an insertion of a white paper sheet; and making the page information include information in regard to the deletion of the specific page and the insertion of the white paper.

(11) According to still another aspect of the present invention, in the method recited in any one of items 8-10, based on the page information, image data sets, respectively corresponding to the pages included in the print job, are sequentially regenerated, one by one in an order, a top page first; and the image forming operation in regard to the print job is commenced, even in mid-course of regenerating the image data sets, serving as the revised image data.

(12) According to a computer readable storage medium reflecting still another aspect of the present invention, the computer readable storage medium stores a computer executable program for performing an image forming operation based on image data in regard to a print job, and the program is executable by a computer to cause the computer to perform a process comprising: applying a rasterization processing to print data, included in a print job, so as to generate image data; storing data, being necessary for reapplying the rasterization processing to the print data, in advance into a first storage section; storing job data in regard to the print job, including the image data generated by the print data processing section, into a second storage section; accepting editing operations, including an operation for changing a page order of pages included in the print job, inputted by a user; and determining whether or not it is necessary to regenerate revised image data, based on contents of the editing operations inputted by the user; wherein, when determining that it is necessary to regenerate the revised image data, the rasterization processing is reapplied to the print data by using the data stored in advance in the first storage section, so as to regenerate the revised image data corresponding to page information that indicates a revised page order, changed from the page order of the pages included in the print job.

(13) According to still another aspect of the present invention, in the computer readable storage medium recited in item 12, when the revised image data is regenerated, the image forming operation is conducted by employing the revised image data, instead of the image data originally stored in the second storage section.

(14) According to still another aspect of the present invention, in the computer readable storage medium recited in item 12 or item 13, the process further comprises: accepting editing operations in regard to a deletion of a specific page and an insertion of a white paper sheet; and making the page information include information in regard to the deletion of the specific page and the insertion of the white paper.

(15) According to yet another aspect of the present invention, in the computer readable storage medium recited in any one of items 12-14, based on the page information, image data sets, respectively corresponding to the pages included in the print job, are sequentially regenerated, one by one in an order, a top page first; and the image forming operation in regard to the print job is commenced, even in mid-course of regenerating the image data sets, serving as the revised image data.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 shows a schematic diagram indicating an example of a second editing screen;

DETAILED DESCRIPTION OF THE PREFERRED EMBODIMENT

Figure 1:
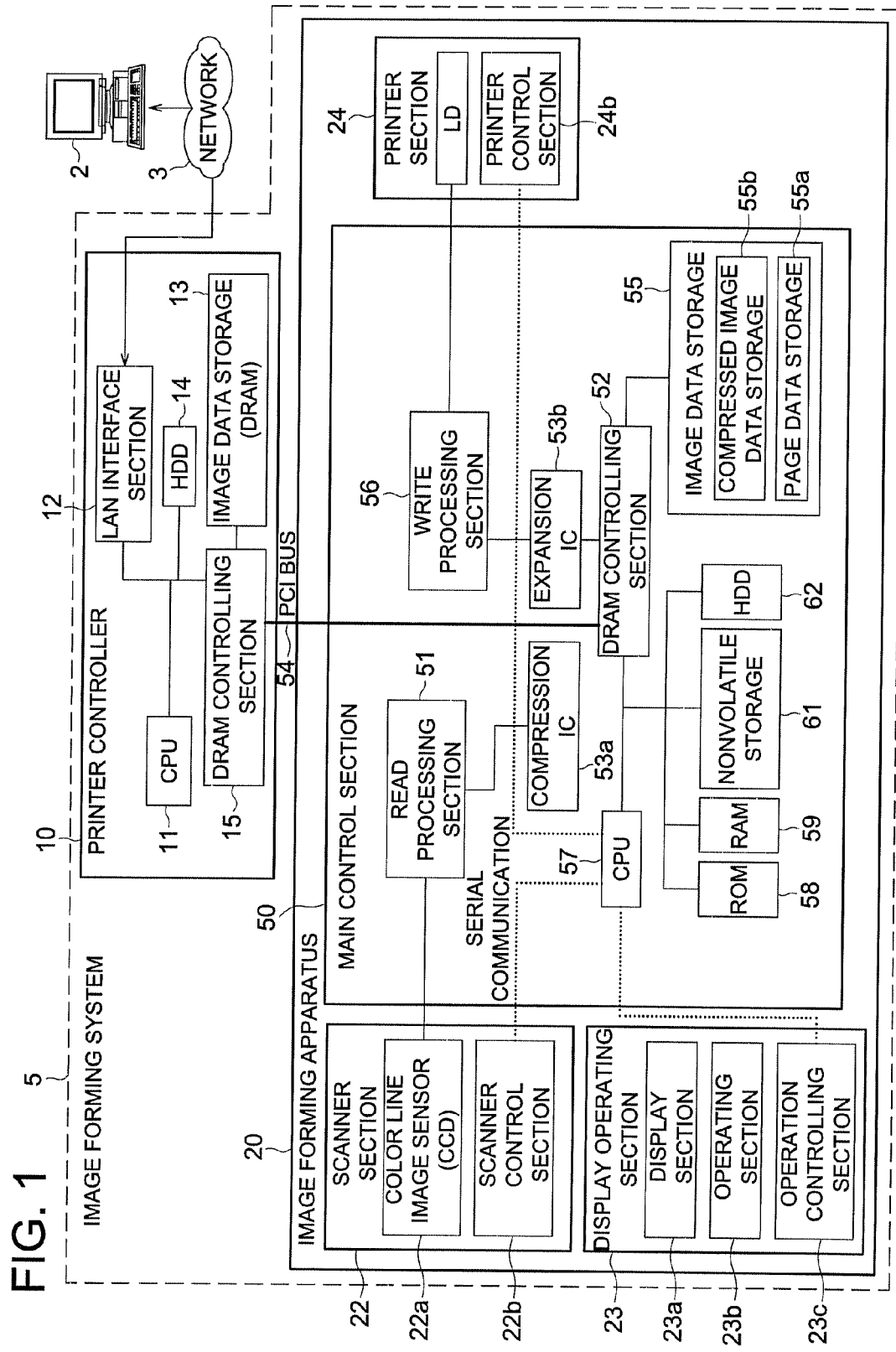
FIG. 1 shows a block diagram indicating a system configuration of an image forming system embodied in the present invention.

Referring to the drawings, the preferred embodiment of the present invention will be detailed in the following.

Figure 2:
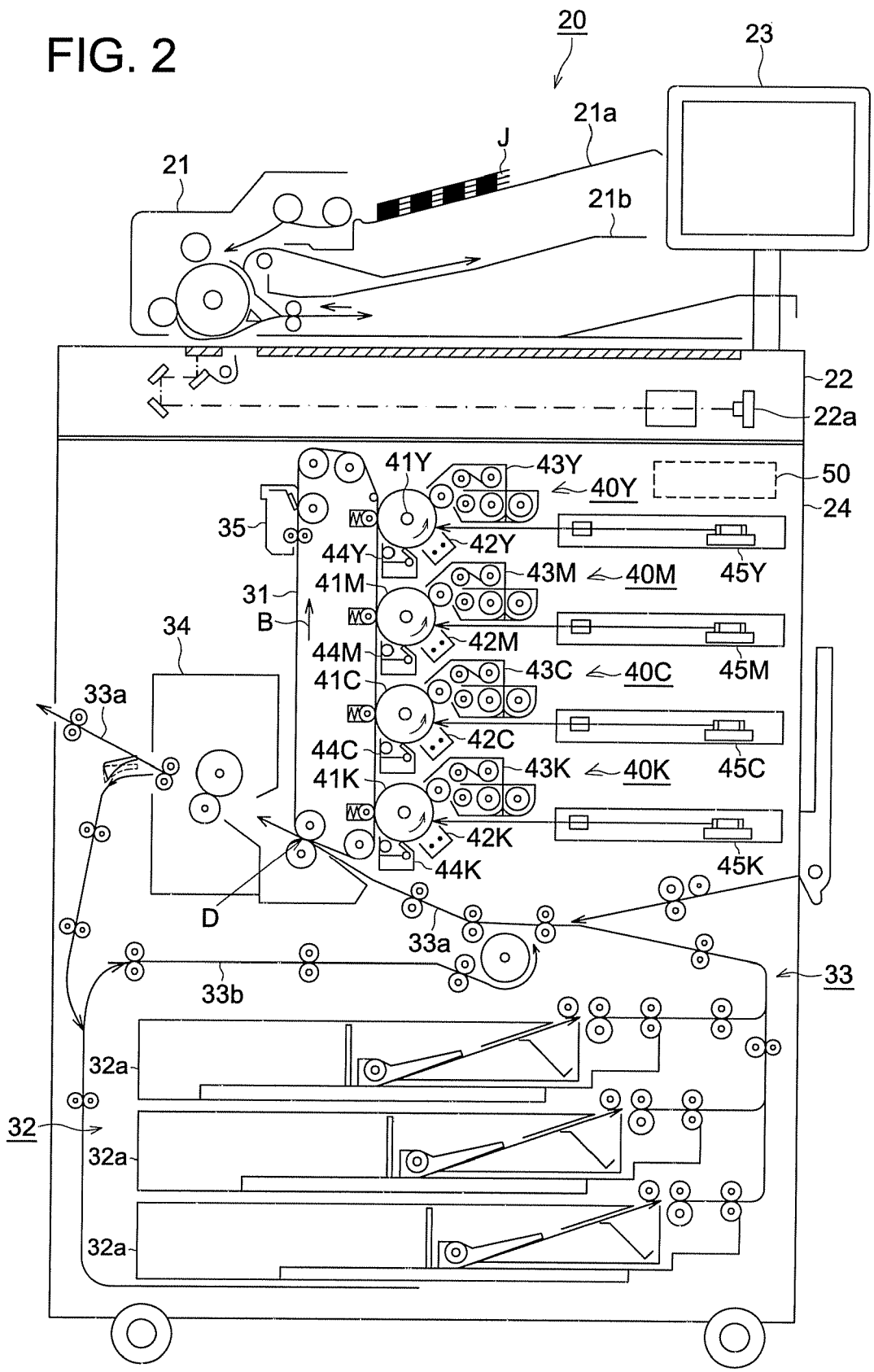
FIG. 2 shows a schematic diagram briefly indicating a mechanical structure of an image forming apparatus embodied in the present invention.

FIG. 1 shows a block diagram indicating a system configuration of an image forming system 5 embodied in the present invention. Further, FIG. 2 shows a schematic diagram briefly indicating a mechanical structure of an image forming apparatus 20 embodied in the present invention.

As shown in FIG. 1, the image forming system 5 is constituted by a printer controller 10 and the image forming apparatus 20. The printer controller 10 is coupled to an information processing apparatus 2, such as a personal computer, etc., through a network 3, such as a LAN (Local Area Network), etc., so as to implement a processing for applying a rasterization processing to a print job, sent from the information processing apparatus 2, to generate image data in regard to the print job concerned (RIP (Raster Image Processing)). In this connection, the abovementioned image data is written in the bitmap format.

Further, the print job, sent from the information processing apparatus 2 and received by the printer controller 10, includes such print data in which characters and figures are represented by code data and/or vector data, for instance, print data written in the Page Description Language. Still further, the Raster Image Processing is such a processing that develops the print data, represented by the code data and/or the vector data, to the image data written in the bitmap format.

The image forming apparatus 20 receives the data of the concerned print job including the image data and sent from the printer controller 10 (hereinafter, referred to as job data), so as to implement a print outputting function for forming a color image or a monochrome image onto a paper sheet to output the paper sheet with the formed image, based on the image data concerned. In the present embodiment, the image forming apparatus 20 is configured as, so called, a Digital Color Multi-functional Apparatus that is provided with a copy function for optically reading the document image so as to form its copy image onto the paper sheet, etc., other than the print outputting function.

On the other hand, the printer controller 10 is provided with: a CPU (Central Processing Unit) 11 for totally controlling the various kinds of operations to be conducted in the printer controller 10; a LAN (Local Area Network) interface section 12 implementing a communicating function for coupling the printer controller 10 to the network 3; an image data storage 13 to store the image data, generated by applying the Raster Image Processing to the print data, and other data, therein; an HDD (Hard Disc Drive) 14 to store the print data received through the network 3, intermediate data to be generated in a mid-course of the Raster Image Processing, etc., therein; and a DRAM (Dynamic Random Access Memory) controlling section 15 for implementing a read/writ function for reading and writing the image data, etc. from/into the image data storage 13, and implementing a transmit/receive function for transmitting and receiving various kinds of data to/from the image forming apparatus 20.

In addition to the above, the CPU 11 is also provided with a ROM (Read Only Memory) in which various kinds of programs and fixed data to be read and executed by the CPU concerned, a working memory (including cache memory) into which various kinds of data are temporarily stored when the CPU 11 executes a certain program concerned, etc., though those are not shown in the drawings.

While, as shown in FIG. 2, the image forming apparatus 20 is constituted by a scanner section 22 that is provided with an automatic document feeder 21, a display operating section 23, a printer section 24 that forms an image onto the paper sheet to output the paper sheet having the image formed thereon and a main control section 50.

The automatic document feeder 21 sequentially feeds document sheets J stacked on a document stacking tray 21a one by one into a reading position disposed in the scanner section 22, and ejects the document sheets J one by one onto a document ejecting tray 21b, every time just after the reading operation for corresponding one of the document sheets J has been completed.

Further, the scanner section 22 optically reads the image of one of the document sheets J, currently residing on the reading position, in either the color or the monochrome reading mode, to acquire image data of the corresponding one of the document sheets J. In this connection, the scanner section 22 is provided with an exposure scanning section including a light source and mirrors, a color line image sensor 22a that receives light reflected from the document so as to output electric signals corresponding to intensities of the reflected light for every one of unicolors employed, various kinds of mirrors and condenser lenses to guide the light reflected from the document to the color line image sensor 22a. Other than the flow reading method in which the scanner section 22 reads one of the document sheets J while the automatic document feeder 21 currently conveys the corresponding one of the document sheets J so as to move it relative to the document reading position, it is also possible for the scanner section 22 to read the one of the document sheets J in a state that the corresponding one of the document sheets J is stationary put on a platen glass.

The printer section 24 is provided with a tandem type image forming section that is constituted by: an intermediate transfer belt 31 that is formed in an endless circular shape; a plurality of image forming sections 40Y, 40M, 40C, 40K, each of which forms a corresponding one of unicolor toner images onto the intermediate transfer belt 31; a paper sheet feeding section 32 to feed a paper sheet on which the image is to be formed; a conveyance section 33 to convey the paper sheet fed from the paper sheet feeding section 32 and a fixing device 34.

The image forming section 40Y forms a toner image of unicolor Y (Yellow) onto the intermediate transfer belt 31, the image forming section 40M forms a toner image of unicolor M (Magenta) onto the intermediate transfer belt 31, the image forming section 40C forms a toner image of unicolor C (Cyan) onto the intermediate transfer belt 31 and the image forming section 40K forms a toner image of unicolor K (Black) onto the intermediate transfer belt 31.

Further, the image forming section 40Y is provided with a photoreceptor drum 41Y serving as a latent image bearing member shaped in a cylinder on a circumferential surface of which an electrostatic latent image is formed, a charging device 42Y, a developing device 43Y and a cleaning device 44Y, which are disposed in a peripheral space around the photoreceptor drum 41Y. Still further, the image forming section 40Y is further provided with a laser unit 45Y that is constituted by a laser diode, a polygon mirror, various kinds of lenses and mirrors, etc.

A driving section (not shown in the drawings) drives the photoreceptor drum 41Y so as to rotate it in a predetermined direction (in a direction indicated by arrow A shown in FIG. 2), while the charging device 42Y uniformly charges the circumferential surface of the photoreceptor drum 41Y. The laser unit 45Y scans the circumferential surface of the photoreceptor drum 41Y with a laser beam modulated by ON/OFF signals corresponding to the image data of unicolor Y (Yellow), to form a latent image of unicolor Y on the circumferential surface of the photoreceptor drum 41Y. Then, the developing device 43Y develops the latent image, formed on the photoreceptor drum 41Y, with toner of unicolor Y so as to form a visible toner image of unicolor Y. Successively, the toner image of unicolor Y formed on the photoreceptor drum 41Y is transferred onto the intermediate transfer belt 31 at the contacting point therewith. Still successively, after the operation for transferring the toner image of unicolor Y is completed, a blade or the like equipped in the cleaning device 44Y scrapes residual toner, remaining on the circumferential surface of the photoreceptor drum 41Y, off the circumferential surface, so as to remove and recovery the residual toner.

In the present embodiment, the configurations and the operations of each of the other image forming sections 40M, 40C, 40K are the same as those of the image forming section 40Y, except that the colors of toner to be employed in the plurality of image forming sections 40Y, 40M, 40C, 40K are different from each other and the laser beams are modulated by employing the image data corresponding to unicolors Y (Yellow), M (Magenta), C (Cyan), K (Black), respectively. Accordingly, explanations for the configurations and the operations of each of the other image forming sections 40M, 40C and 40K are omitted. In this connection, hereinafter in the drawings and the descriptions, the same structural elements among the plurality of image forming sections 40Y, 40M, 40C, 40K are indicated by attaching the symbols Y (Yellow), M (Magenta), C (Cyan), K (Black) to the same reference number, respectively.

The intermediate transfer belt 31 is threaded on a plurality of rollers, so as to circle around the plurality of rollers in a direction indicated by arrow B, shown in FIG. 2, during the image forming operation. In the circulating process of the intermediate transfer belt 31, the plurality of image forming sections 40Y, 40M, 40C, 40K sequentially form unicolor toner images Y (Yellow), M (Magenta), C (Cyan), K (Black) one by one, in such a manner that the unicolor toner images Y, M, C, K are made to overlap with each other onto the intermediate transfer belt 31 so as to form a full color toner image superimposed thereon. Successively, the full color toner image is transferred from the intermediate transfer belt 31 onto the paper sheet at a secondary transferring position D.

A belt cleaning device 35 to remove the residual toner remaining on the intermediate transfer belt 31 is disposed downstream the secondary transferring position D in the circulating direction of the intermediate transfer belt 31.

The paper sheet feeding section 32 includes a plurality of paper sheet feeding cassettes 32a, and sequentially picks up the paper sheets accommodated in a currently selected one of the paper sheet feeding cassettes 32a, so as to feed the paper sheets one by one towards the conveyance section 33. In this connection, the conveyance section 33 is provided with not only a normal pass 33a through which the paper sheet, fed from the paper sheet feeding cassette 32a, is conveyed to the secondary transferring position D and successively conveyed to the fixing device 34, so as to eject the processed paper sheet either onto an ejecting tray or into a post processing apparatus (both not shown in the drawings), but also an inversion pass 33b through which obverse and reverse sides of the concerned paper sheet, passed through the fixing device 34, are inverted to each other, and then, the concerned paper sheet is made to again flow into the normal pass 33a, in order to cope with the duplex printing.

The post processing apparatus is such an apparatus that is provided with various kinds of post processing functions, such as scoring a paper sheet, making and stapling a bunch of paper sheets, punching a paper sheet, etc., and is coupled to the image forming apparatus 20 as a later processing stage. The contents of the post processing to be applied in the post processing apparatus are designated by a control command to be outputted from the main control section 50 of the image forming apparatus 20 to the post processing apparatus concerned.

Now, returning to FIG. 1, the electrical configuration of the image forming apparatus 20 will be detailed in the following. The image forming apparatus 20 is constituted by coupling the scanner section 22, the printer section 24 and the display operating section 23 to the main control section 50 that totally controls the various kinds of operations to be conducted in the image forming apparatus 20.

In addition to the color line image sensor 22a shown in FIG. 2, the scanner section 22 is also provided with a scanner control section 22b to control the operations to be conducted in the scanner section 22 as a whole. Further, in addition to the laser diodes each of which emits the laser beam modulated by ON/OFF signals corresponding to the image data of each of unicolors Y, M, C, K, the printer section 24 is provided with a printer control section 24b that controls the various kinds of operations to be performed by the intermediate transfer belt 31, the plurality of image forming sections 40Y, 40M, 40C, 40K, the paper sheet feeding section 32, the conveyance section 33, the fixing device 34, etc. Other than the above, the printer control section 24b also coupled to various kinds of elements for activating the intermediate transfer belt 31, the plurality of image forming sections 40Y, 40M, 40C, 40K, the paper sheet feeding section 32, the conveyance section 33, etc., such as motors, solenoids, sensors, etc., though those are not shown in the drawings.

The display operating section 23 displays various kinds of setting screens, first and second editing screens 70, 80 detailed later, various kinds of guidance information, notifications, warnings for the user, etc., thereon, and accepts various kinds of setting, selecting and/or editing operations performed by the user, therefrom. The display operating section 23 is constituted by a display section 23a including a LCD (Liquid Crystal Display), an operating section 23b provided with a touch switch mounted over the screen of the display section 23a and other switches, and an operation controlling section 23c to control the display section 23a and the operating section 23b.

In this connection, each of the scanner control section 22b, the operation controlling section 23c and the printer control section 24b is constituted by electric circuits including a CPU (Central Processing Unit), a ROM (Read Only Memory), a RAM (Random Access Memory), etc., as its main section, so as to implement various kinds of controlling operations by executing programs stored in the ROM.

In order to totally control the operations of the image forming apparatus 20, the main control section 50 is constituted by a read processing section 51, a DRAM (Dynamic Random Access Memory) controlling section 52, a compression IC (Integrated Circuit) 53a, an expansion IC (Integrated Circuit) 53b, an image data storage 55 including semiconductor memories, a write processing section 56, a CPU (Central Processing Unit) 57, a ROM (Read Only Memory) 58, a RAM (Random Access Memory) 59, a nonvolatile storage 61, an HDD (Hard Disc Drive) 62, etc.

The read processing section 51 applies various kinds of image processing, such as a size enlargement processing, a mirror image processing, an error diffusion processing, etc., to the image data outputted by the scanner section 22. The compression IC 53a compresses the image data to generate compressed image data, while the expansion IC 53b expands the compressed image data so as to generate the original image data same as that before being compressed. The image data storage 55 serves as either a page data storage 55a, which is capable of storing non-compressed image data in a unit of one page, or a compressed image data storage 55b, which is capable of storing compressed image data, or the like.

Based on the image data, read from the compressed image data storage 55b and expanded by the expansion IC 53b, the write processing section 56 outputs the ON/OFF signals for driving each of the laser diodes equipped in the laser units 45Y, 45M, 45C, 45K so as to modulate the laser beam emitted by corresponding one of the laser diodes, at an appropriate timing corresponding to the operations currently performed in the printer section 24.

On the other hand, the DRAM controlling section 52 conducts various kinds of controlling operations, such as operations for controlling timings of read/write and refresh actions for the image data storage 55 constituted by the Dynamic RAM, operations for compressing the image data and storing the compressed image data into the compressed image data storage 55b, operations for controlling timings of reading the compressed image data from the compressed image data storage 55b and expanding the compressed image data, etc. Further, the DRAM controlling section 52 of the image forming apparatus 20 is coupled to the DRAM controlling section 15 of the printer controller 10 through a PCI (Peripheral Component Interconnect) bus 54, so as to communicate various kinds of data between the image forming apparatus 20 and the printer controller 10 through the PCI bus 54.

In the present embodiment, the printer controller 10 is incorporated in the inner space of the image forming apparatus 20. When the printer controller 10 is equipped outside the image forming apparatus 20, the data transactions between the image forming apparatus 20 and the printer controller 10 may be conducted by employing an interface being appropriate for both of them.

The CPU 57 controls all of the operations to be conducted in image forming apparatus 20 as a whole. The ROM 58 stores various kinds of programs, fixed data, etc., therein, while the CPU 57 performs various kinds of controlling operations by executing the programs stored in the RON 58. The RAM 59 serves as a working memory to temporarily store various kinds of data therein, when the CPU 57 executes any one of the programs. Further, the nonvolatile storage 61 serves as such a storage that stores specific data to be retained in the storage even after the electric power supply is turned OFF, such as user's data, system data, etc. Still further, the HDD 62 stores the data in regard to the print job (job data) received from the printer controller 10, or the like, to retain them therein.

Figure 3:
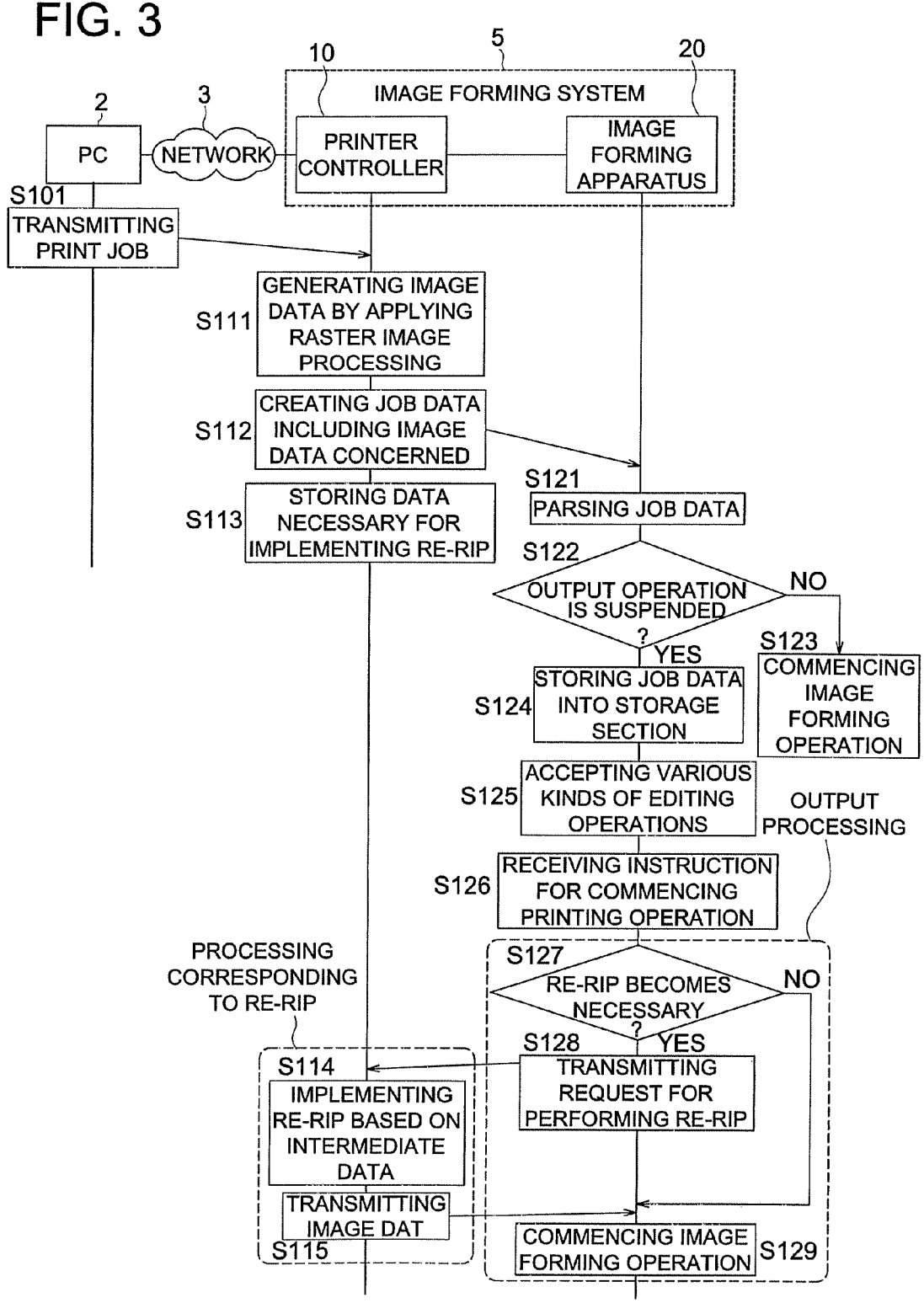
FIG. 3 shows a flowchart indicating an overall print processing flow to be conducted in an image forming system.

FIG. 3 shows a flowchart indicating an overall print processing flow to be conducted in the image forming system 5. Initially, the information processing apparatus 2 transmits a print job (including print data) to the printer controller 10 through a printer driver (Step S101).

Successively, the CPU 11 of the printer controller 10 receives the print job sent from the information processing apparatus 2, and then, applies the RIP (Raster Image Processing) to the print data included in the print job received, so as to generate image data (Step S111). Further, the CPU 11 creates job data, including the image data concerned and code data for controlling the image forming apparatus 20, such as output setting items, etc., so as to transmit the created job data to the image forming apparatus 20 (Step S112). In this connection, the job data includes a job number for uniquely specifying the print job in regard to the job data concerned.

Still successively, the CPU 11 stores such data that is necessary for implementing the re-RIP (Regeneration Raster Image Processing) in which image data is regenerated by again applying the RIP, in regard to the print job concerned, to the print data while changing the processing conditions, such as the color tone, a kind of paper sheet, etc., into the HDD 14 and/or the image data storage 13 (Step S113). In this connection, it is applicable that the data to be stored is any one of data included in the print job received from the information processing apparatus 2, print data itself, and predetermined intermediate data generated in a mid-course of the processing for generating the image data from the print data. Further, the job number is attached to the data to be stored, so as to correlate them with each other.

Still successively, the CPU 57 of the image forming apparatus 20 parses the job data received from the printer controller 10 (Step S121), so as to determine whether or not an instruction (control code data) for suspending the output operation is attached to the job data concerned (Step S122). When determining that the instruction for suspending the output operation is not attached (in the case of printing mode) (Step S122; No), the CPU 57 immediately commences the image forming operation (printing operation) based on the job data received (Step S123).

On the other hand, when determining that the instruction for suspending the output operation is attached (in the case of holding mode) (Step S122; Yes), the CPU 57 stores the received job data into the storage section (HDD 62) (Step S124), without immediately implementing the image forming operation based on the job data concerned.

During the holding mode, the image forming apparatus 20 is capable of accepting various kinds of editing operations, such as a change of page order, a deletion of a specific page, an insertion of a white paper sheet, a change of image attributes, etc., in regard to the job data stored into the HDD 62, through the display operating section 23 (Step S125). When accepting the editing operations, the CPU 57 stores information indicating that the print job concerned has been edited according to the accepted editing operations into the HDD 62, while correlating the information with the job data of the concerned print job.

The editable items is categorized into a group of items, which can be edited only by applying processing to be conducted in the image forming apparatus 20 side, such as a change of output tray, a change between the one side printing mode and the duplex printing mode, and another group of items, which cannot be edited only by applying processing to be conducted in the image forming apparatus 20 side, but require an image data regenerating operation (re-RIP), serving as the rasterization processing to be conducted in the printer controller 10. Further, the system is so constituted that any one of both the image forming apparatus 20 and the printer controller 10 can cope with such change items that relate to the page structure, such as a change of page order, a deletion of a specific page, an insertion of a white paper sheet, etc.

Still successively, when receiving the instruction for commencing a printing operation in regard to a specific job stored in the HDD 62 (printing request), which is inputted by the user from the display operating section 23 (Step S126), the CPU 57 of the image forming apparatus 20 implements the output processing in regard to the print job concerned (Step S127 through Step S129). Concretely speaking, the CPU 57 determines whether or not the re-RIP becomes necessary for the print job concerned, as a result of the editing operation conducted in Step S125 (Step S127). When determining that the re-RIP is not necessary (Step S127; No), the CPU 57 starts the image forming operation in regard to the print job concerned (Step S129). On this occasion, if an editing item being editable in the image forming apparatus 20 side only (for instance, a change of output tray) has been accepted in Step S125, the CPU 57 implements the image forming operation while performing the processing corresponding to the editing item concerned.

On the other hand, when determining that the re-RIP becomes necessary (Step S127; Yes), the CPU 57 transmits a request for performing the re-RIP (hereinafter, referred to as a re-RIP request) to the printer controller 10 (Step S128). Other than the job number, the re-RIP request includes the processing conditions (processing conditions changed by the editing operations conducted by the user) under which the concerned re-RIP is to be implemented. In this connection, when the page structure is changed, the information indicating the contents of the page structure currently changed (hereinafter, referred to as page information) is also included in the re-RIP request as one of the processing conditions.

Receiving the re-RIP request, the printer controller 10 implements the processing corresponding to the re-RIP. Concretely speaking, with respect to the print job designated by the job number included in the re-RIP request received, the printer controller 10 implements the re-RIP under the processing conditions designated by the re-RIP request concerned, so as to regenerate image data (Step S114). Then, the printer controller 10 transmits the image data, regenerated by the re-RIP, to the image forming apparatus 20 (Step S115). In this connection, the abovementioned re-RIP is implemented on the basis of the data (intermediate data) stored in advance in previous Step S113.

Still successively, the image forming apparatus 20 commences the image forming operation in regard to the print job concerned by using the image data regenerated by the re-RIP and received from printer controller 10 (Step S129).

Figure 4:
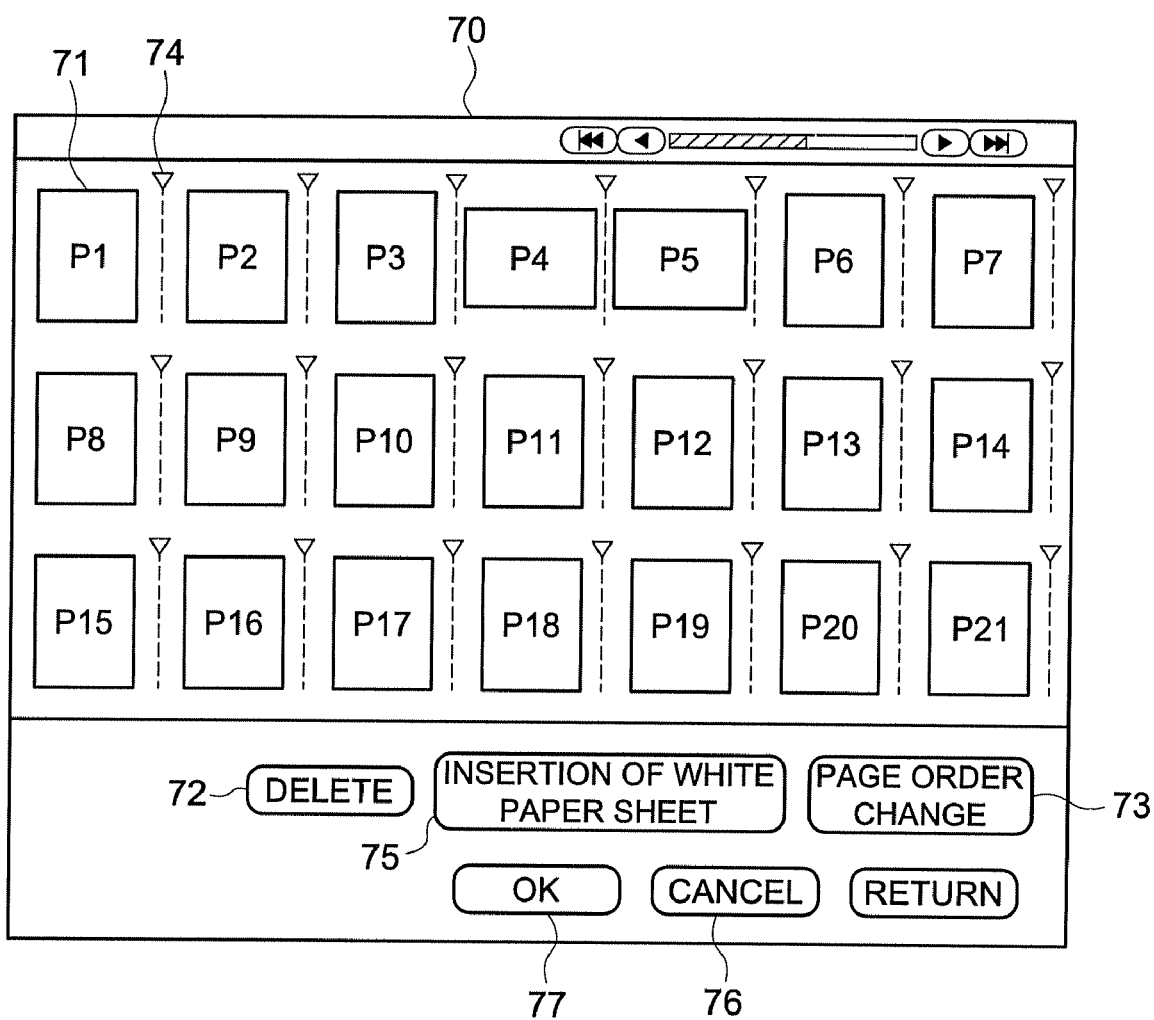
FIG. 4 shows a schematic diagram indicating an example of a first editing screen.

FIG. 4 shows a schematic diagram indicating an example of a first editing screen 70 from which various kinds of editing operations in regard to the page structure, such as a change of page order, a deletion of a specific page, an insertion of a white paper sheet, etc., are inputted by the user. Receiving an operation for clicking a predetermined button arranged in a menu screen (not shown in the drawings) after receiving an operation for selecting a specific print job, the CPU 57 displays the first editing screen 70 on the display operating section 23. Size-reduced images corresponding to the pages included in the print job concerned (thumbnail images, hereinafter, referred to as size-reduced images 71 or a size-reduced image 71) are displayed on the first editing screen 70 in a thumbnail displaying mode. Further, at the same time, various kinds of operating buttons for conducting the editing operations are also displayed on the right-lower area of the screen. Still further, the page numbers P1, P2, P3, - - - are attached to the size-reduced images 71 displayed on the first editing screen 70, respectively.

The editing operation for deleting a specific page is defined as such an operation that, after selecting and depressing a specific one of the size-reduced images 71, serving as a deletion objective image, the user depresses a deletion button 72. Further, the editing operation for changing a page order is defined as such an operation that, after selecting and depressing specific two of the size-reduced images 71, serving as order change objective images, the user depresses an order change button 73. Still further, the editing operation for inserting a white paper is defined as such an operation that, after selecting and depressing a specific one of upside-down triangular-shaped insertion marks 74, located at a position desired by the user, the user depresses a white paper insertion button 75. After that, if the user wishes to cancel the just-previously conducted editing operation, the user can depress a cancel button 76, while if the user wishes to fix the current contents (results) of the editing operation, the user can depress a OK button 77. Receiving the operation for fixing the current contents (results) of the editing operation, the CPU 57 stores the information indicating the page structure (page information), established after conducting the editing operation, into the HDD 62, while correlating the page information with the job data of the print job concerned.

FIG. 5 shows a schematic diagram indicating an example of a second editing screen 80 to be displayed on the display section 23a of the display operating section 23 by the CPU 57 of the image forming apparatus 20. Receiving the operation for depressing a predetermined button after receiving the operation for selecting the print job from the menu screen (not shown in the drawings), the CPU 57 displays a second editing screen 80 on the display operating section 23. Then, a preview image 81 of a page, which is currently in mid-course of editing operation among the pages included in the selected print job, is displayed on the second editing screen 80. Further, a page number column 82 for indicating a page number of the page, currently serving as the editing objective page, and a page shift button 83 for shifting the editing objective page back and forth are displayed at the lower bottom area of the preview image 81. Still further, in the second editing screen 80, the names of the editing objective items and setting values of them are displayed item by item in such a manner that the names and the setting values correspond to each other, respectively. Yet further, a settlement button 84 serves as an operation button for fixing the setting items and values currently set in the second editing screen 80 by the editing operations.

The job data received from the printer controller 10 and stored into the HDD 62 includes the data representing the setting values with respect to all of the setting items displayed on the second editing screen 80, and the initial values of setting items to be displayed on the second editing screen 80 are made to reflect the setting values included in the job data concerned.

The user can conduct the operation for selecting a specific one from the editing objective items and changing its setting value from the second editing screen 80 concerned. It is possible for the user to change setting contents in regard to the editing items with respect to post processing operations, such as a selection of ejecting tray, a kind of paper sheet, a color tone, a folding, a stapling, a punching, etc., respectively.

When displaying the second editing screen 80, the CPU 57 backups the job data (excluding the image data) stored in the HDD 62, so that, every time when receiving the editing operation from the user, the CPU 57 changes the setting value of the concerned item included in the original job data stored in the HDD 62 to the other setting value established after the editing operation conducted by the user. Further, when the settlement button 84 is depressed, the CPU 57 compares the revised job data edited by the user with the original job data backupped in advance to recognize the items changed, so as to store information indicating presence or absence of the changed items, namely, information indicating whether or not it is an editing job, into the HDD 62, while correlating the information with the print job concerned.

Further, when recognizing the changed items, the CPU 57 determines whether or not a specific item that requires the re-RIP is included in the changed items recognized. Concretely speaking, with respect to each of the items displayed within the second editing screen 80, since the information indicating whether or not the concerned item is such an item that requires the re-RIP is stored in the ROM 58 or the RAM 59 in advance, the CPU 57 refers to this information in order to determine whether or not the specific item that requires the re-RIP is included in the changed items recognized. Then, the CPU 57 stores this determining result (the information indicating whether or not the re-RIP is required) into the HDD 62, while correlating it with the job data of the print job concerned.

When a closing button 85, instead of the settlement button 84, is depressed, the CPU 57 returns the edited job data (excluding image data) to the original job data (excluding image data) backupped in advance.

Figure 6:
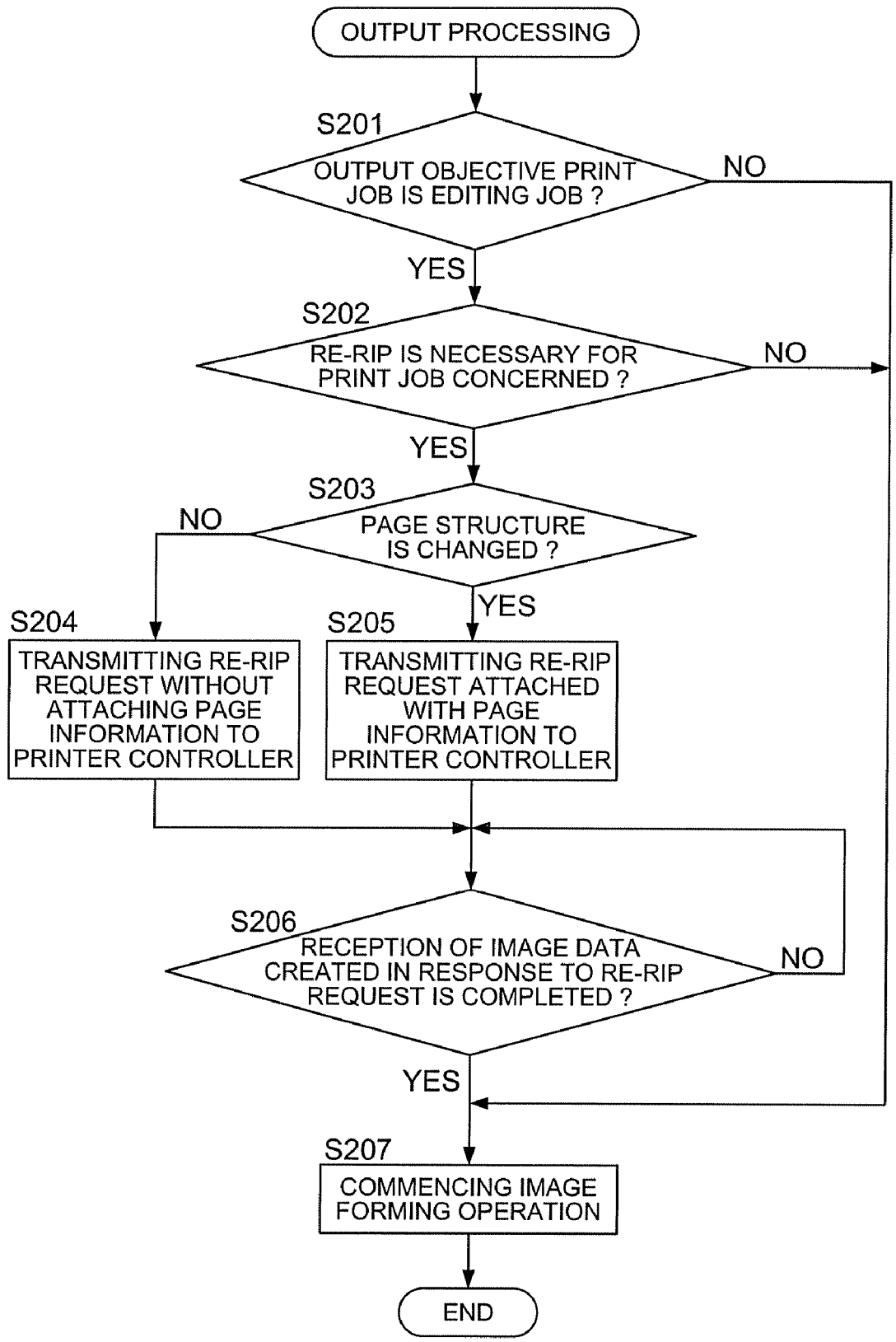
FIG. 6 shows a flowchart indicating output processing to be conducted by a CPU (Central Processing Unit) of an image forming apparatus embodied in the present invention.

FIG. 6 shows a flowchart indicating the output processing, shown in FIG. 3, in detail. At first, the CPU 57 of the image forming apparatus 20 determines whether or not the output objective print job is the editing job (Step S201). When determining that the output objective print job is not the editing job (Step S201; No), the CPU 57 commences the image forming operation in regard to the print job concerned (Step S207). In this case, the image forming operation is conducted on the basis of the image data included in the job data of the print job concerned, stored in the HDD 62. On that occasion, if the page information is also stored while correlating it with the job data of the print job concerned, the image forming operation is conducted by employing the page structure in accordance with the page information concerned. For instance, when the page information represents a change of page order, the CPU 57 conducts the image forming operation by employing a new page order revised in accordance with the page information.

On the other hand, when determining that the output objective print job is the editing job (Step S201; Yes), based on the determining result, which is stored and correlated with the print job concerned, the CPU 57 determines whether or not the re-RIP is necessary for the print job concerned (Step S202). When determining that the re-RIP is not necessary (Step S202; No), the CPU 57 commences the image forming operation in regard to the print job concerned (Step S207). In this case, the image forming operation is conducted on the basis of the image data included in the job data of the print job concerned, stored in the HDD 62. On that occasion, if the page information is also stored while correlating it with the job data of the print job concerned, the image forming operation is conducted by employing the page structure in accordance with the page information concerned. For instance, when the page information represents a change of page order, the CPU 57 conducts the image forming operation by employing a new page order revised in accordance with the page information.

When determining that the re-RIP is necessary (Step S202; Yes), the CPU 57 further determines whether or not the page structure of the print job concerned is changed (Step S203). In the present embodiment, if the page information is stored while being correlated with the job data of the print job concerned, the CPU 57 determines that the page structure of the print job concerned is changed, while, if the page information is not stored, the CPU 57 determines that the page structure of the print job concerned is not changed. When determining that the page structure of the print job concerned is changed (Step S203; Yes), the CPU 57 transmits the re-RIP request attached with the page information stored in advance while being correlated with the job data of the print job concerned, to the printer controller 10 (Step S205), and then, shifts the processing to Step S206. When determining that the page structure of the print job concerned is not changed (Step S203; No), the CPU 57 transmits the re-RIP request without attaching the page information, to the printer controller 10 (Step S204), and then, shifts the processing to Step S206.

Figure 7:
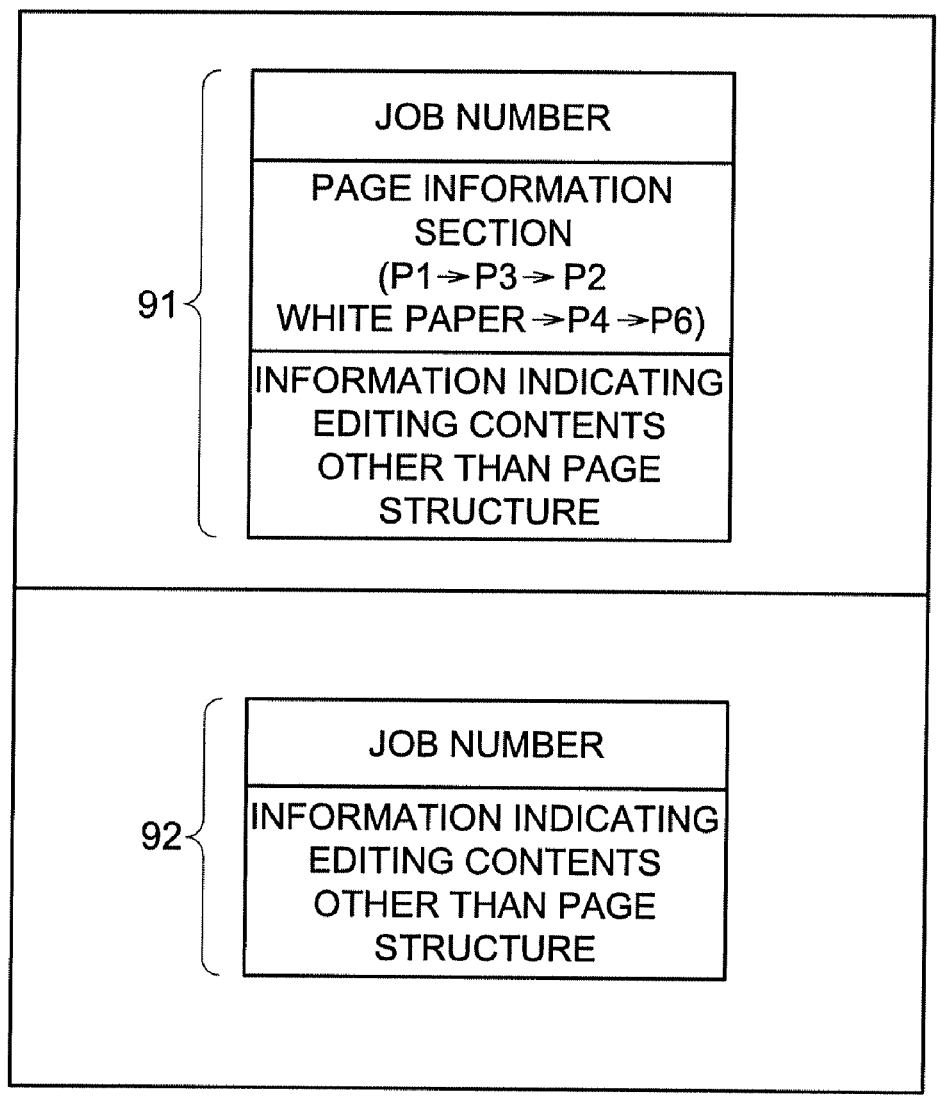
FIG. 7 shows a schematic diagram indicating data structures of a re-RIP request embodied in the present invention.

FIG. 7 shows a schematic diagram indicating data structures of the re-RIP request. A re-RIP request 91 attached with the page information and another re-RIP request 92 without attaching the page information are indicated in the upper area and the lower area of the schematic diagram shown in FIG. 7, respectively. The re-RIP request 91 attached with the page information is constituted by the job member for specifying the print job, the page information representing the page structure and the information indicating the editing contents other than the page structure (for instance, only a changed portion among the job data after its changing operation has been completed, or all of portions, excluding the image data, among the job data after its changing operation has been completed). On the other hand, the re-RIP request 92 without attaching the page information is constituted by the job number and the information indicating the editing contents other than the page structure.

Further, the page information included in the re-RIP request 91 indicates that the page structure of the print job concerned, after its changing operation has been completed, is constituted by the six pages including a first page P1, a third page P3, a second page P2, a white paper sheet to be inserted, a fourth page P4 and a sixth page P6, in this order from the leading page. In the above example, a fifth page P5 will be deleted.

Figure 8:
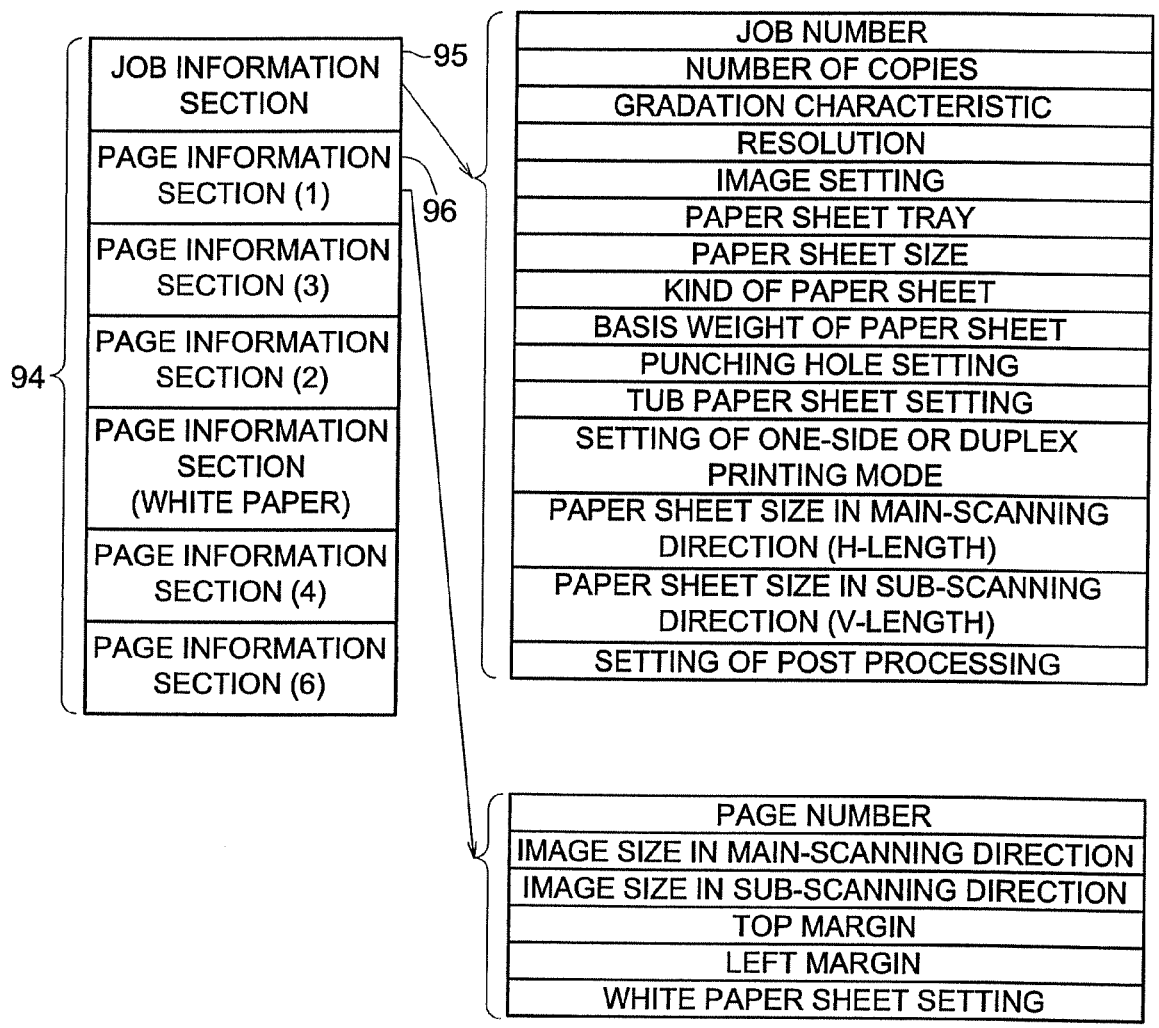
FIG. 8 shows a schematic diagram indicating another example of the data structure of a re-RIP request attached with page information.

FIG. 8 shows a schematic diagram indicating another example of the data structure of the re-RIP request attached with the page information. A re-RIP request 94 attached with the page information is constituted by a job information section 95, in which information in regard to a whole print job concerned are stored, and page information sections 96, in each of which information in regard to each of the pages included in the print job concerned is stored. As shown in FIG. 8, a plurality of the page information sections 96, corresponding to a number of pages necessary for the print job concerned, are cascaded in such an order that represents the page structure, and coupled to the trailing portion of the job information section 95. The re-RIP request 94 shown in FIG. 8 represents the page structure being same as that of re-RIP request 91 shown in FIG. 7.

As shown in FIG. 8, the various kinds of information, such as a print job number, a number of copies, a gradation property, a resolution, etc., are stored in the job information section 95. The item of "IMAGE SETTING" represents a selection of the color or monochrome mode and a designation of the screen, the item of "PAPER SHEET TRAY" represents a designation of the paper sheet feeding source to be employed for the image forming operation, and the item of "PAPER SHEET SIZE" can be designated as a custom setting other than a standard size. Further, when designating a concrete "PAPER SHEET SIZE" as the custom setting, the user can designate it from the item of "PAPER SHEET SIZE IN MAIN-SCANNING DIRECTION (HORIZONTAL LENGTH)" and the item of "PAPER SHEET SIZE IN SUB-SCANNING DIRECTION (VERTICAL LENGTH)". The item of "KIND OF PAPER SHEET" represents a designation of the glossy paper sheet, the normal paper sheet, etc., while the item of "BASIS WEIGHT OF PAPER SHEET" represents a designation of the paper sheet thickness. Further, the item of "SETTING OF PUNCHING HOLE" represents a designation of presence or absence of a punching hole, the item of "SETTING OF TUB PAPER SHEET" represents a designation of whether or not the concerned paper sheet is a tub paper sheet (index paper sheet) and the item of "SETTING OF ONE SIDE OR DUPLEX PRINTING MODE" represents a designation of whether images are formed on one sides of paper sheets or on both sides of the paper sheets.

Further, each of the page information sections 96 is constituted by a page number (page number in the original page order), a size of an image to be printed on the concerned page in the main-scanning direction, a size of an image to be printed on the concerned page in the sub-scanning direction, a top margin (designation of the image-writing start position in the sub-scanning direction), a left margin (designation of the image-writing start position in the main-scanning direction), a white paper sheet setting (designation of either a white paper image or a depicted image), etc. In this connection, the re-RIP request having no information in regard to the page structure is constituted only by the job information section 95.

Returning to the flowchart shown in FIG. 6, the explanations for the successive flow will be continued in the following. In Step S206, the CPU 57 waits the reception of the image data that is created in response to the re-RIP request previously transmitted to the printer controller 10 and sent back to the image forming apparatus 20 (Step S206; No). When receiving the image data created in response to the re-RIP request (Step S206; Yes), the CPU 57 commences the image forming operation in regard to the print job concerned, by employing the received image data (Step S207). On that occasion, if the CPU 57 has received the editing operation to be conducted in the image forming apparatus 20 side, such as a change of output tray, etc., the CPU 57 implements the image forming operation after completing the processing in regard to the editing operation concerned.

Since the printer controller 10 copes with the operation for changing the page structure, no processing is required in the image forming apparatus 20 side to cope with the operation for changing the page structure. Further, it is applicable that, every time when the reception of image data for each of the output paper sheets is completed in Step S206, the CPU 57 implements the image forming operation for the single paper sheet concerned, or after the reception of the image data, regenerated for all of the pages included in the print job concerned by applying the re-RIP, has been completed, the CPU 57 commences the image forming operation in regard to the print job concerned. Anyway, the image data regenerated by applying the re-RIP and received from the printer controller 10 is stored in HDD 62, until at least the image forming operation based on the above-regenerated image data is completed.

Figure 9:
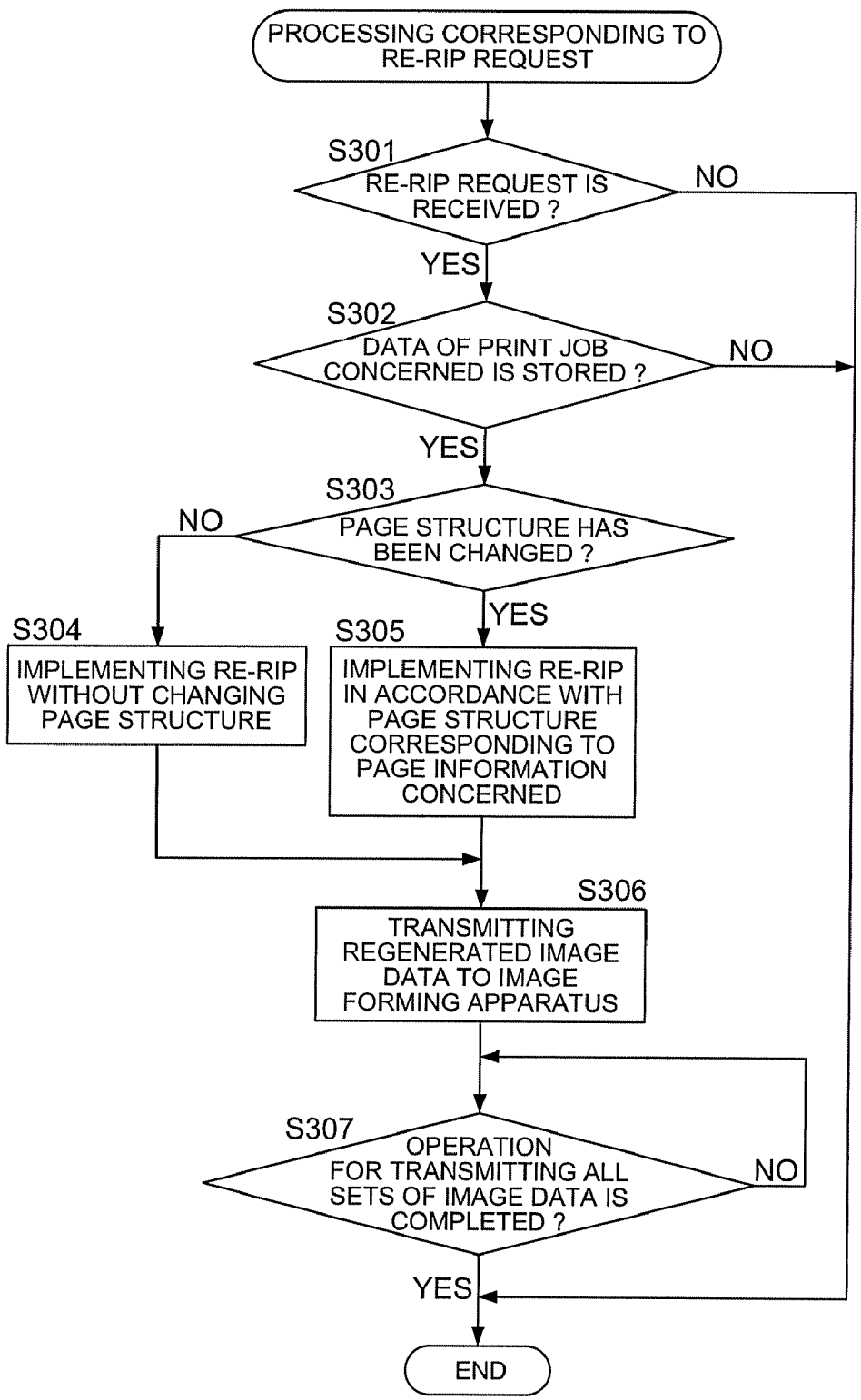
FIG. 9 shows a flowchart indicating detailed processing corresponding to a re-RIP, to be conducted by a CPU (Central Processing Unit) of a printer controller embodied in the present invention.

FIG. 9 shows a flowchart indicating details of the re-RIP (refer to FIG. 3), to be conducted in the printer controller 10. At first, receiving the re-RIP request sent from the image forming apparatus 20 (Step S301; Yes), the CPU 11 investigates whether or not the data of the print job (intermediate data, etc.) correlated to the job number designated by the re-RIP request concerned is stored in the image data storage 13 or the HDD 14 (Step S302). When determining that the concerned data is not stored (Step S302; No), the CPU 11 finalizes the re-RIP. On that occasion, it is applicable that a kind of error information or the like is sent back to the image forming apparatus 20.

On the other hand, when determining that the concerned data is stored (Step S302; Yes), the CPU 11 further investigates whether or not the page information is included in the re-RIP request concerned, namely, whether or not the page structure has been changed (Step S303). When determining that the page structure has been changed (Step S303; Yes), the CPU 11 implements the re-RIP in accordance with the page structure corresponding to the page information concerned and under the other conditions designated by the re-RIP request, so as to regenerate the image data (Step S305).

In other words, based on the data (intermediate data, etc.) stored in the image data storage 13 or the HDD 14, the CPU 11 reflects various kinds of processing conditions designated by the re-RIP request onto the abovementioned data, and applies the Raster Image Processing to the data concerned by employing the page structure designated by the page information (namely, conducting the page order change, the insertion of the white paper sheet, the page deletion (page skipping), etc.), so as to regenerate image data for every page.

Figure 10:
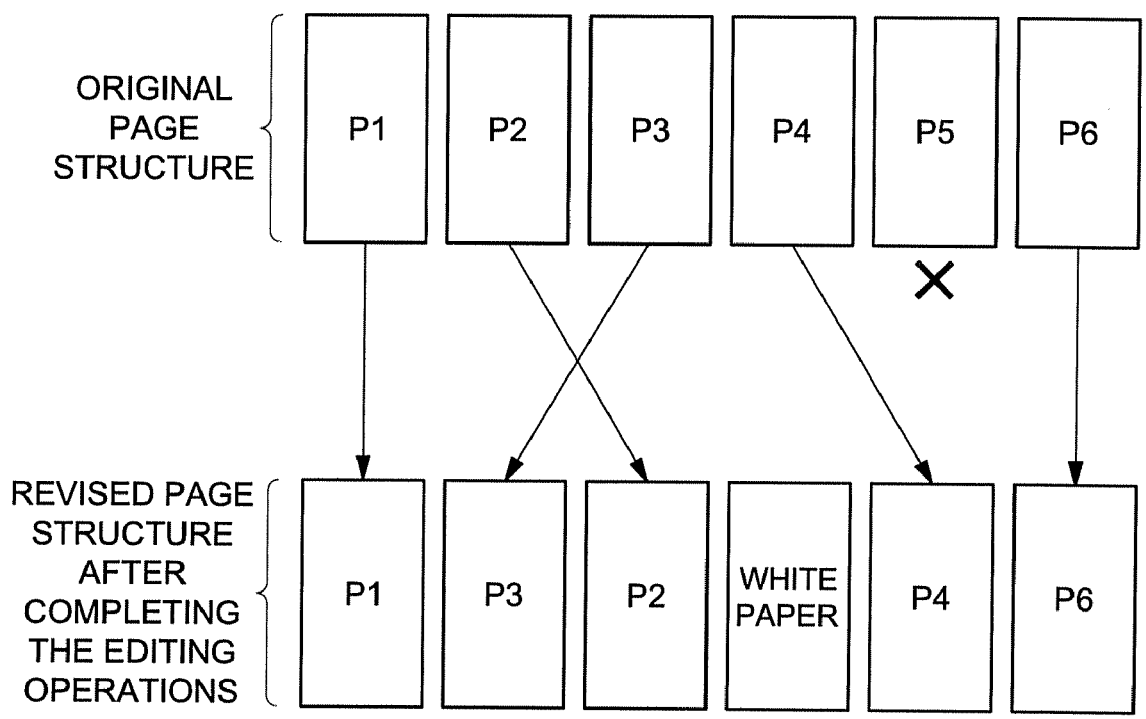
FIG. 10 shows an explanatory schematic diagram indicating an exemplary relationship between an original page structure and a revised page structure.

For instance, FIG. 10 shows a schematic diagram indicating a structure of image data to be regenerated when the re-RIP request with the page information shown in FIG. 7 is received. In FIG. 10, an original page structure and a page structure of the image data regenerated in response to the re-RIP request are indicated in the upper area and the lower area of the schematic diagram, respectively. As shown in FIG. 10, the CPU 11 sequentially generates image data sets of the first page P1, the third page P3 and the second page P2 one by one in this order by applying the Raster Image Processing, and successively, generates an image data set of the white paper sheet, and still successively, generates image data sets of the fourth page P4 and the sixth page P6 one by one in this order by applying the Raster Image Processing.

Retuning to the flowchart, when determining that the page structure has not been changed (the page information is not included in the re-RIP request concerned) (Step S303; No), the CPU 11 performs the re-RIP under the processing conditions designated by the re-RIP request, while employing the original page structure without changing the page structure, so as to generate the image data (Step S304).

Successively, every time when completing the operation for generating one set of image data for a single page as a result of performing the re-RIP in either Step S305 or Step S304, the CPU 11 transmits the generated set of image data for the single page concerned one by one to the image forming apparatus 20 (Step S306), and then, at the time when completing the operation for transmitting all sets of image data for the pages included in the print job concerned (Step S307; Yes), the CPU 11 finalizes the re-RIP indicated in the flowchart shown in FIG. 9 (END).

As described in the foregoing, when the editing operations including the change of page structure, such as the page order, etc., have been conducted in the image forming apparatus 20, and the re-RIP has become necessary as the result of the editing operations concerned, the image forming apparatus 20 transmits the re-RIP request, including information indicating the revised page structure after completing the editing operations, to the printer controller 10, so that the printer controller 10 can conducts the re-RIP corresponding to the above-revised page structure after the editing operations. Accordingly, when implementing the re-RIP, it becomes unnecessary for the image forming apparatus 20 side to perform such processing for changing the page order, etc., and therefore, it becomes possible to speedily and effectively cope with the instruction for changing the page structure.

Further, when conducting the re-RIP, since the printer controller 10 sequentially generates the image data according to the page order corresponding to the revised page structure after completing the editing operations, so as to sequentially transmit the generated image data to the image forming apparatus 20, the image forming apparatus 20 may merely perform the image forming operations of the pages according to the page order received from the printer controller 10 as it is. Accordingly, every time when completing the operation for receiving one set of image data for a single output paper sheet, the image forming apparatus 20 can commence the image forming operation in regard to the output paper sheet concerned. For instance, even when the page orders of the final page and the first page are swapped with each other, since the image data of the final page is received at first as the initial page, it becomes possible for the image forming apparatus 20 to immediately commence the image forming operation just after the reception of the image data of the initial page has completed, resulting in a prevention of the delay of the image forming commencement timing and an improvement of the productivity, compared to the conventional image forming method in which the image forming apparatus 20 rearranges the page order after the image data of all pages included in the concerned print job has completed, and then, commences the image forming operation.

Although the various kinds of embodiments of the present invention have been detailed in the foregoing while referring to the drawings, the scope of the present invention is not limited to the embodiments described in the foregoing. Modifications and additions made by a skilled person without departing from the spirit and scope of the invention shall be included in the scope of the present invention.

Concretely speaking, each of the first editing screen 70 and the second editing screen 80 is merely an exemplary screen embodied in the present invention. Accordingly, any kinds of arbitral screen structures and inputting operations are applicable for this purpose as far as editing operations are acceptable. Further, the data structures of the data of the print job, the job data and the re-RIP request, shown in FIG. 7 and FIG. 8, are merely exemplified structures, and the scope of the data structure of each of them is not limited to each of the exemplified structures.

Still further, although the system exemplified in the foregoing is so constituted that the various kinds of operations, such as the change of the page order, the deletion of the specific page and the insertion of the white paper sheet, can be accepted as the editing operations, it is applicable that at least the change of the page order is included as the editing operation, or otherwise, another operating item is included as the editing operation. For instance, it is applicable that a page copying operation for inserting an image of the second page P2 into the second page and the fifth page is included in the editing operations of the page structure.

Still further, although the digital color multi-functional apparatus is exemplified as the image forming apparatus 20 in the preferred embodiment described in the foregoing, it is also applicable that the image forming apparatus 20 is configured as a single body printer without being provided with the scanner section 22, etc., as far as the single body printer is provided with a function for receiving job data including image data, sent from the printer controller 10, so as to output the printouts based on the job data. Further, it is applicable that the image forming apparatus 20 is such an apparatus that can cope with monochrome images only, instead of a color image forming apparatus.

Still further, although the image forming apparatus 20 that incorporates the printer controller 10 inside the apparatus is indicated as the exemplified configuration embodied in the present invention, it is also applicable that the printer controller 10 is installed in the image forming system as an apparatus being separate from the image forming apparatus 20.

Yet further, although it is determined whether the job data is stored in the HDD 62 or the job is immediately implemented on the basis of the job data, depending on the presence or absence of the output retention, in the preferred embodiment, it is also applicable that the system is so constituted that the job data is always stored in the HDD 62.

According to the image forming system embodied in the present invention, since it is possible for the printer controller to regenerate the image data according to the page order accepted by the image forming apparatus, it becomes possible to effectively cope with the instruction for changing the page order.

While the preferred embodiments of the present invention have been described using specific term, such description is for illustrative purpose only, and it is to be understood that changes and variations may be made without departing from the spirit and scope of the appended claims.

What is claimed is:

1. An image forming system comprising:
a printer controller that applies a rasterization processing to print data in regard to a print job so as to generate rasterized image data in regard to the print job, the printer controller being provided with a first storage section to store data being necessary for reapplying the rasterization processing to the print data in regard to the print job, therein and
an image forming apparatus that has no function for re-rasterizing the rasterized image data from the print data, but receives job data including the rasterized image data generated by the printer controller, so as to perform an image forming operation based on the rasterized image data included in the job data received from the printer controller, the image forming apparatus being provided with a second storage section, a display operating section and a control section, wherein, in the image forming apparatus, the control section makes the second storage section store the job data in regard to the print job received from the printer controller therein, and accepts editing operations including an operation for changing a page order of pages included in the print job, inputted through the display operating section, so as to determine whether or not it is necessary to regenerate re-rasterized image data by reapplying the rasterization processing to the print data, based on contents of the editing operations inputted through the display operating section, and wherein, when determining that it is necessary to regenerate the re-rasterized image data, the control section of the image forming apparatus transmits only a predetermined regeneration request including page information for indicating a revised page order, changed from the page order of the pages included in the print job, to the printer controller, without transmitting the rasterized image data, which included in the print job received from the printer controller and stored in the second storage section, and wherein, in response to receiving the predetermined regeneration request, the printer controller is adapted to reapply the rasterization processing to the print data using the data stored in advance in the first storage section, so as to regenerate the re-rasterized image data corresponding to the page information, and then, transmits the re-rasterized image data to the image forming apparatus, and wherein, in response to receiving the re-rasterized image data regenerated in response to the predetermined regeneration request, from the printer controller, the image forming apparatus is adapted to perform the image forming operation in regard to the print job, based on the re-rasterized image data.

2. The image forming system of claim 1,
wherein the control section further accepts editing operations in regard to a deletion of a specific page and an insertion of a white paper sheet, and makes the page information include information in regard to abovementioned change items.

3. The image forming system of claim 1,
wherein, based on the page information, the printer controller sequentially regenerates image data sets, respectively corresponding to the pages included in the print job, and sequentially transmits the image data sets to the image forming apparatus one by one in an order, a top page first; and
wherein the image forming apparatus commences the image forming operation in regard to the print job, even in mid-course of receiving the image data sets, serving as the re-rasterized image data regenerated in response to the predetermined regeneration request.

4. An image forming apparatus that performs an image forming operation based on rasterized image data in regard to a print job, comprising:
a print data processing section to apply a rasterization processing to print data, included in the print job, so as to generate the rasterized image data;
a first storage section to store data, being necessary for reapplying the rasterization processing to the print data, in advance therein;
a second storage section to store job data in regard to the print job, including the rasterized image data generated by the print data processing section, therein;
a display operating section to accepts editing operations, including an operation for changing a page order of pages included in the print job, inputted by a user; and
a control section to determine whether or not it is necessary to make the print data processing section reapply the rasterization processing to the print data so as to regenerate re-rasterized image data, based on contents of the editing operations inputted by the user through the display operating section;
wherein, when determining that it is necessary to regenerate the re-rasterized image data, the control section of the image forming apparatus transmits only a predetermined regeneration request including page information for indicating a revised page order, changed from the page order of the pages included in the print job, to a printer controller and the control section makes the print data processing section reapply the rasterization processing to the print data while using the data stored in advance in the first storage section, so as to regenerate the re-rasterized image data corresponding to page information that indicates a revised page order, changed from the page order of the pages included in the print job, wherein the control section does not transmit the rasterized image data, which is included in the print job and stored in the second storage section.

5. The image forming apparatus of claim 4,
wherein, when the re-rasterized image data is regenerated, the image forming operation is conducted by employing the re-rasterized image data, instead of the rasterized image data originally stored in the second storage section.

6. The image forming apparatus of claim 4,
wherein the display operating section further accepts editing operations in regard to a deletion of a specific page and an insertion of a white paper sheet, and the control section makes the page information includes information in regard to abovementioned change items.

7. The image forming apparatus of claim 4,
wherein, based on the page information, the print data processing section sequentially regenerates image data sets, respectively corresponding to the pages included in the print job, one by one in an order, a top page first; and
wherein the image forming operation in regard to the print job is commenced, even in mid-course of regenerating the image data sets, serving as the re-rasterized image data.

8. A method for performing an image forming operation based on rasterized image data in regard to a print job, comprising:
applying a rasterization processing to print data, included in the print job, so as to generate the rasterized image data;
storing data, being necessary for reapplying the rasterization processing to the print data, in advance into a first storage section;
storing job data in regard to the print job, including the rasterized image data generated by the print data processing section, into a second storage section;
accepting editing operations, including an operation for changing a page order of pages included in the print job, inputted by a user; and
determine whether or not it is necessary to regenerate re-rasterized image data, based on contents of the editing operations inputted by the user through a display operating section;
wherein, when determining that it is necessary to regenerate the re-rasterized image data, a control section of an image forming apparatus transmits only a predetermined regeneration request including page information for indicating a revised page order, changed from the page order of the pages included in the print job, to a printer controller and the control section, the rasterization processing is reapplied to the print data by using the data stored in advance in the first storage section, so as to regenerate the re-rasterized image data corresponding to page information that indicates a revised page order, changed from the page order of the pages included in the print job, wherein the rasterized image data, which is included in the print job and stored in the second storage section, is not transmitted.

9. The method of claim 8,
wherein, when the re-rasterized image data is regenerated, the image forming operation is conducted by employing the re-rasterized image data, instead of the rasterized image data originally stored in the second storage section.

10. The method of claim 8, further comprising:
accepting editing operations in regard to a deletion of a specific page and an insertion of a white paper sheet; and
making the page information include information in regard to the deletion of the specific page and the insertion of the white paper.

11. The method of claim 8,
wherein, based on the page information, image data sets, respectively corresponding to the pages included in the print job, are sequentially regenerated, one by one in an order, a top page first; and
wherein the image forming operation in regard to the print job is commenced, even in mid-course of regenerating the image data sets, serving as the re-rasterized image data.

12. A non-transitory computer readable storage medium storing a computer executable program for performing an image forming operation based on image data in regard to a print job, the program being executable by a computer to cause the computer to perform a process comprising:
applying a rasterization processing to print data, included in the print job, so as to generate the rasterized image data;
storing data, being necessary for reapplying the rasterization processing to the print data, in advance into a first storage section;
storing job data in regard to the print job, including the rasterized image data generated by the print data processing section, into a second storage section;
accepting editing operations, including an operation for changing a page order of pages included in the print job, inputted by a user; and
determine whether or not it is necessary to regenerate re-rasterized image data, based on contents of the editing operations inputted by the user through a display operating section;
wherein, when determining that it is necessary to regenerate the re-rasterized image data, a control section of an image forming apparatus transmits only a predetermined regeneration request including page information for indicating a revised page order, changed from the page order of the pages included in the print job, to a printer controller and the control section, the rasterization processing is reapplied to the print data by using the data stored in advance in the first storage section, so as to regenerate the re-rasterized image data corresponding to page information that indicates a revised page order, changed from the page order of the pages included in the print job, wherein the rasterized image data, which is included in the print job and stored in the second storage section, is not transmitted.

13. The non-transitory computer readable storage medium of claim 12,
wherein, when the re-rasterized image data is regenerated, the image forming operation is conducted by employing the re-rasterized image data, instead of the rasterized image data originally stored in the second storage section.

14. The non-transitory computer readable storage medium of claim 12, the process further comprising:
accepting editing operations in regard to a deletion of a specific page and an insertion of a white paper sheet; and
making the page information include information in regard to the deletion of the specific page and the insertion of the white paper.

15. The non-transitory computer readable storage medium of claim 12,
wherein, based on the page information, image data sets, respectively corresponding to the pages included in the print job, are sequentially regenerated, one by one in an order, a top page first; and
wherein the image forming operation in regard to the print job is commenced, even in mid-course of regenerating the image data sets, serving as the re-rasterized image data.

* * * * *